(12) United States Patent
Fukushima et al.

(10) Patent No.: US 12,541,590 B2
(45) Date of Patent: Feb. 3, 2026

(54) INFORMATION PROVISION METHOD AND INFORMATION PROCESSING DEVICE

(71) Applicant: Panasonic Automotive Systems Co., Ltd., Kanagawa (JP)

(72) Inventors: Hideyo Fukushima, Kanagawa (JP); Koyo Moriya, Kanagawa (JP); Yuki Murata, Tokyo (JP); Masayoshi Ohtani, Kanagawa (JP); Yuki Fukuhara, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 17 days.

(21) Appl. No.: 18/809,615

(22) Filed: Aug. 20, 2024

(65) Prior Publication Data

US 2024/0411875 A1      Dec. 12, 2024

Related U.S. Application Data

(63) Continuation of application No. PCT/JP2022/038437, filed on Oct. 14, 2022.

(30) Foreign Application Priority Data

Mar. 3, 2022     (JP) ................................. 2022-032354

(51) Int. Cl.
*G06F 21/55*      (2013.01)
*B60W 50/14*      (2020.01)
(Continued)

(52) U.S. Cl.
CPC .......... *G06F 21/554* (2013.01); *B60W 50/14* (2013.01); *B60W 60/001* (2020.02);
(Continued)

(58) Field of Classification Search
CPC ... G06F 21/554; B60W 60/001; B60W 50/14; B60W 2050/146; H04L 63/1416; H04L 63/1425; H04L 63/1441
(Continued)

(56) References Cited

U.S. PATENT DOCUMENTS

| | | | | |
|---|---|---|---|---|
| 6,420,975 B1 * | 7/2002 | DeLine | ................ | G06Q 20/341 |
| | | | | 381/86 |
| 9,697,355 B1 * | 7/2017 | Park | ...................... | G06F 21/554 |

(Continued)

FOREIGN PATENT DOCUMENTS

| | | | | |
|---|---|---|---|---|
| JP | 2020-021135 | | 2/2020 | |
| WO | WO-2019136027 A1 * | | 7/2019 | ............. H04L 67/12 |

OTHER PUBLICATIONS

International Search Report issued in International Pat. Appl. No. PCT/JP2022/038437, dated Dec. 20, 2022, along with an English language translation thereof.

*Primary Examiner* — Tauqir Hussain
(74) *Attorney, Agent, or Firm* — Greenblum & Bernstein, P.L.C.

(57) ABSTRACT

An information provision method is executed by an information processing device that: obtains attack information through communication with a security monitoring device that determines presence or absence of an attack based on log information obtained from a vehicle; and provides countermeasure information to a passenger inside the vehicle or a person outside the vehicle. The information provision method includes: receiving, from the security monitoring device, attack information including a threat level of an attack on a vehicle and vehicle information for identifying the vehicle in association with each other; and transmitting, to the vehicle identified by the vehicle information, an instruction that causes a presenter included in the vehicle to present countermeasure information determined (Continued)

| Operation status | Threat level | Operation instruction | Interior presentation instruction | Exterior presentation instruction |
|---|---|---|---|---|
| In operation (with passenger on board) | Level A | Operation stop | Presented | Presented |
| | Level B | Operation stop | Presented | Not presented |
| | Level C | Operation continuation | Not presented | Not presented |
| In operation (with no passenger on board) | Level A | Operation stop | Not presented | Presented |
| | Level B | Operation stop | Not presented | Not presented |
| | Level C | Operation continuation | Not presented | Not presented |
| Out of service (with no passenger on board) | Level A | Out-of-service stop | Not presented | Presented |
| | Level B | Out-of-service stop | Not presented | Not presented |
| | Level C | Out-of-service continuation | Not presented | Not presented |
| Not operated (stationary in depot) | Level A | Operation prohibition | Not presented | Not presented |
| | Level B | Operation prohibition | Not presented | Not presented |
| | Level C | Operation permission | Not presented | Not presented | depending on the threat level, the countermeasure information presented by the presenter being information that prompts a passenger inside the vehicle or a person outside the vehicle to act to avoid an impact of the attack.

9 Claims, 8 Drawing Sheets

(51) Int. Cl.
  *B60W 60/00* (2020.01)
  *H04L 9/40* (2022.01)
(52) U.S. Cl.
  CPC ...... *H04L 63/1416* (2013.01); *H04L 63/1425* (2013.01); *H04L 63/1441* (2013.01); *B60W 2050/146* (2013.01)
(58) Field of Classification Search
  USPC .......................................................... 726/23
  See application file for complete search history.

(56) References Cited

U.S. PATENT DOCUMENTS

| | | | |
|---|---|---|---|
| 10,205,733 B1* | 2/2019 | Park | H04L 63/18 |
| 10,516,681 B2* | 12/2019 | Ruvio | H04W 12/12 |
| 10,630,699 B2* | 4/2020 | Galula | H04L 63/1416 |
| 11,921,853 B2* | 3/2024 | Filipek | G06F 21/554 |
| 2018/0081357 A1* | 3/2018 | Datta Gupta | G05D 1/021 |
| 2018/0295147 A1* | 10/2018 | Haga | H04L 67/12 |
| 2019/0036948 A1* | 1/2019 | Appel | G06N 20/00 |
| 2019/0052653 A1* | 2/2019 | Galula | B60R 16/02 |
| 2019/0191311 A1* | 6/2019 | O'Brien | H04W 4/024 |
| 2020/0005633 A1* | 1/2020 | Jin | H04L 63/04 |
| 2021/0150830 A1* | 5/2021 | Ogawa | G06F 11/324 |
| 2021/0258339 A1* | 8/2021 | Dyakin | H04W 12/122 |
| 2021/0326437 A1* | 10/2021 | Juliato | H04L 63/1458 |
| 2022/0224700 A1* | 7/2022 | Appel | H04L 63/1441 |

* cited by examiner

FIG. 5

| Threat level | Type of security attack (anticipated risk) |
|---|---|
| Level A | ·Unexpected false move<br>·Undrivable |
| Level B | ·Performance degradation |
| Level C | ·No impact on operation |

| Threat level | Operation instruction | Interior presentation instruction | Exterior presentation instruction |
|---|---|---|---|
| Level A | Operation stop | Presented | Presented |
| Level B | Operation stop | Presented | Not presented |
| Level C | Operation continuation | Not presented | Not presented |

| Presence or absence of impact on same vehicle type | Threat level | Operation instruction | Interior presentation instruction | Exterior presentation instruction |
|---|---|---|---|---|
| Present | Level A | Operation stop | Presented | Presented |
| Present | Level B | Operation stop | Presented | Not presented |
| Present | Level C | Operation continuation | Not presented | Not presented |
| Absent | Level A | Operation continuation | Not presented | Not presented |
| Absent | Level B | Operation continuation | Not presented | Not presented |
| Absent | Level C | Operation continuation | Not presented | Not presented |

| Operation status | Threat level | Operation instruction | Interior presentation instruction | Exterior presentation instruction |
|---|---|---|---|---|
| In operation (with passenger on board) | Level A | Operation stop | Presented | Presented |
| | Level B | Operation stop | Presented | Not presented |
| | Level C | Operation continuation | Not presented | Not presented |
| In operation (with no passenger on board) | Level A | Operation stop | Not presented | Presented |
| | Level B | Operation stop | Not presented | Not presented |
| | Level C | Operation continuation | Not presented | Not presented |
| Out of service (with no passenger on board) | Level A | Out-of-service stop | Not presented | Presented |
| | Level B | Out-of-service stop | Not presented | Not presented |
| | Level C | Out-of-service continuation | Not presented | Not presented |
| Not operated (stationary in depot) | Level A | Operation prohibition | Not presented | Not presented |
| | Level B | Operation prohibition | Not presented | Not presented |
| | Level C | Operation permission | Not presented | Not presented |

FIG. 9

| Vehicle information | Vehicle type | Operation status |
|---|---|---|
| Vehicle 400 | Vehicle type A | In operation (with passenger on board) |
| Vehicle 401 | Vehicle type A | In operation (with passenger on board) |
| Vehicle 402 | Vehicle type B | In operation (with passenger on board) |
| Vehicle 403 | Vehicle type A | Not operated |
| ... | ... | ... |

FIG. 10

| Vehicle information | Vehicle type | Threat level | Operation status | Operation instruction | Interior presentation instruction | Operation status |
|---|---|---|---|---|---|---|
| Vehicle 400 | Vehicle type A | Level A | In operation (with passenger on board) | Operation stop | Presented | Presented |
| Vehicle 401 | Vehicle type A | — | In operation (with passenger on board) | Operation stop | Presented | Presented |
| Vehicle 402 | Vehicle type B | — | In operation (with passenger on board) | — | — | — |
| Vehicle 403 | Vehicle type A | — | Not operated | Operation prohibition | Not presented | Not presented |
| ... | ... | ... | ... | ... | ... | ... |

INFORMATION PROVISION METHOD AND INFORMATION PROCESSING DEVICE

CROSS REFERENCE TO RELATED APPLICATIONS

This is a continuation application of PCT International Application No. PCT/JP2022/038437 filed on Oct. 14, 2022, designating the United States of America, which is based on and claims priority of Japanese Patent Application No. 2022-032354 filed on Mar. 3, 2022.

FIELD

The present disclosure relates to an information provision method and an information processing device.

BACKGROUND

Patent Literature (PTL) 1 discloses a center device that integrates a plurality of pieces of information on a vehicle, which are obtained from the vehicle, and determines a state of the vehicle related to reprogramming data downloaded from a file server to a vehicle master device.

CITATION LIST

Patent Literature

PTL 1: Japanese Unexamined Patent Application Publication No. 2020-21135

SUMMARY

However, the technology according to PTL 1 can be improved upon.

In accordance with an aspect of the present disclosure, an information provision method executed by an information processing device that: obtains attack information through communication with a security monitoring device that determines presence or absence of an attack based on log information obtained from a vehicle; and provides countermeasure information to a passenger inside the vehicle or a person outside the vehicle, the information provision method including: receiving, from the security monitoring device, attack information that includes a threat level and vehicle information in association with each other, the threat level indicating a level of threat of an attack on a first vehicle, the vehicle information being information for identifying the first vehicle; and transmitting, to the first vehicle identified by the vehicle information, an instruction that causes a first presenter included in the first vehicle to present countermeasure information determined depending on the threat level, the countermeasure information presented by the first presenter being information that prompts a passenger inside the first vehicle or a person outside the first vehicle to act to avoid an impact of the attack.

General or specific aspects of the present disclosure may be implemented to a system, a method, an integrated circuit, a computer program, a non-transitory computer-readable recording medium such as a Compact Disc-Read Only Memory (CD-ROM), or any given combination thereof.

The above-described aspects are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 5 is a table showing association between threat level and type of security attack.

FIG. 6 is a table showing an example of a counteracting rule for a first vehicle targeted for a security attack.

FIG. 7 is a table showing an example of a counteracting rule for a second vehicle that is of the same vehicle type as the first vehicle.

FIG. 8 is a table showing another example of the counteracting rule for the first vehicle targeted for a security attack.

FIG. 9 is a table showing the operation status stored for each vehicle in an operation database (DB).

FIG. 10 is a table showing an example of control instructions generated by the information processing device according to Embodiment.

DESCRIPTION OF EMBODIMENT

Figure 1:
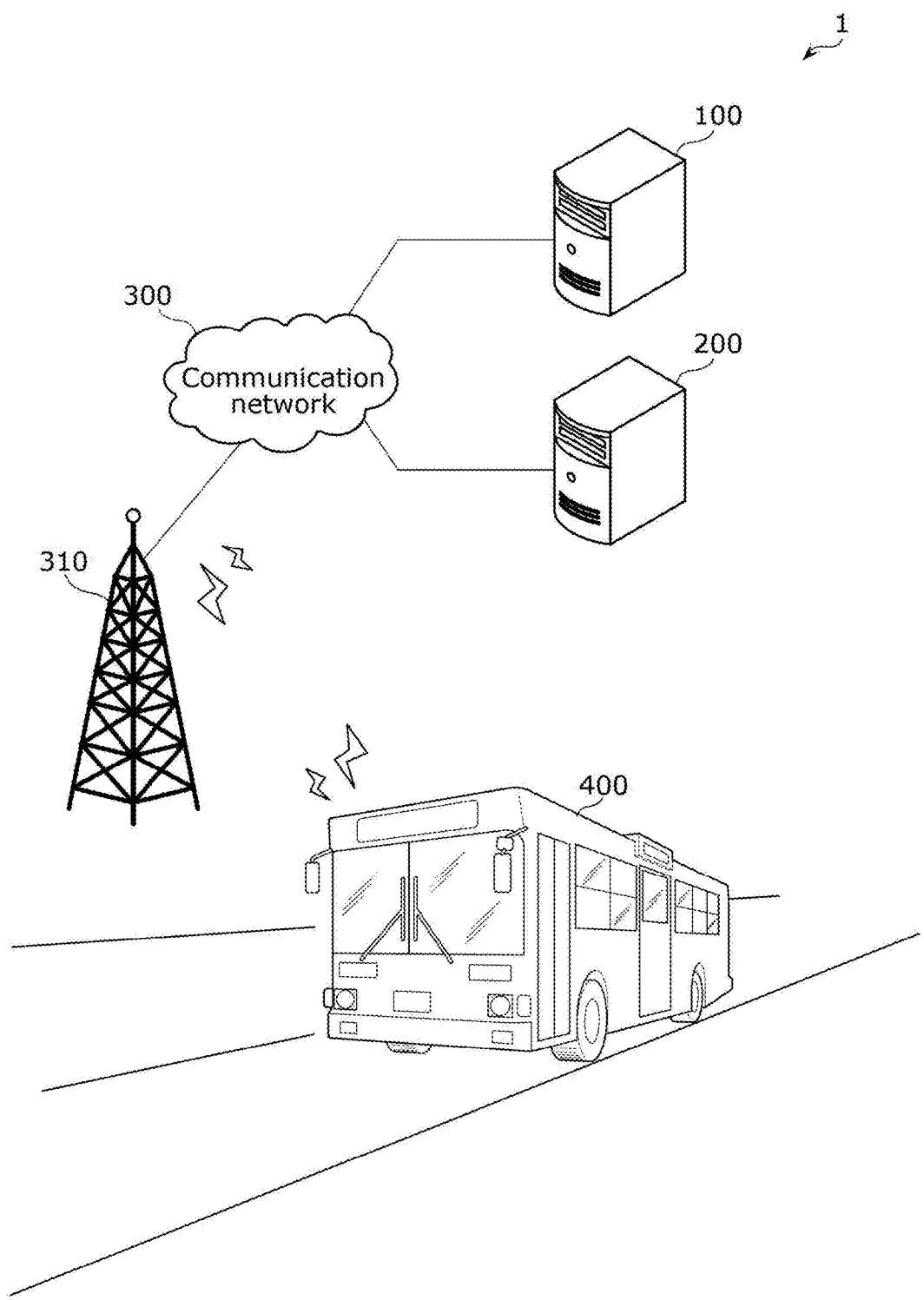
FIG. 1 is a schematic view of an information provision system that provides information to a vehicle according to Embodiment.

Underlying Knowledge Forming Basis of the Present Disclosure

In relation to the center device in the Background section, the inventors have found the following issue.

The technology disclosed in PTL 1 visualizes and presents an anomalous situation of the vehicle to the user. However, only from the presentation of the anomalous situation of the vehicle, it is difficult for the user to determine how to act to avoid the impact of the anomaly. More specifically, consideration according to this technology in the event of a security attack made on the vehicle in operation via a network does not include information provision, from the vehicle under the security attack, for reducing an adverse impact on passengers in the vehicle, people around the vehicle, and other vehicles around the vehicle.

As a result of intensive studies, the inventors have found an information provision method of reducing an adverse impact of a security-attacked vehicle on passengers in the vehicle, people around the vehicle, and other vehicles around the vehicle.

In accordance with an aspect of the present disclosure, an information provision method executed by an information processing device that: obtains attack information through communication with a security monitoring device that determines presence or absence of an attack based on log information obtained from a vehicle; and provides countermeasure information to a passenger inside the vehicle or a person outside the vehicle, the information provision method including: receiving, from the security monitoring device, attack information that includes a threat level and vehicle information in association with each other, the threat level indicating a level of threat of an attack on a first vehicle, the vehicle information being information for identifying the first vehicle; and transmitting, to the first vehicle identified by the vehicle information, an instruction that causes a first presenter included in the first vehicle to present countermeasure information determined depending on the threat level, the countermeasure information presented by the first presenter being information that prompts a passenger inside the first vehicle or a person outside the first vehicle to act to avoid an impact of the attack.

With this, against the attack on the first vehicle, the first presenter included in the first vehicle presents the countermeasure information. This prompts the passenger inside the first vehicle or the person outside the first vehicle to act to avoid the impact of this attack. As a result, this can reduce the impact of the attacked vehicle on the passenger inside the first vehicle or the person outside the first vehicle.

It is possible that the first presenter includes: a first interior presenter disposed inside a cabin of the first vehicle; and a first exterior presenter disposed on an exterior of the first vehicle, and that in the transmitting, when the threat level is a first level indicating a risk that requires information provision inside and outside the first vehicle, the instruction that causes the first presenter to present the countermeasure information is transmitted to the first interior presenter and the first exterior presenter, and when the threat level is a second level that is lower in the threat level than the first level, the instruction that causes the first presenter to present the countermeasure information is transmitted only to the first interior presenter out of the first interior presenter and the first exterior presenter.

With this, if the threat level of the attack is the first level, the countermeasure information is presented to the passenger inside the first vehicle and the person outside the first vehicle. If the threat level of the attack is the second level that is lower in the threat level than the first level, the countermeasure information is presented to the passenger inside the first vehicle. In other words, a target for the presentation of the countermeasure information can be determined depending on the threat level of the attack. Furthermore, the number of targets for being prompted to act to avoid the impact of the attacked vehicle can be minimized.

It is possible that the information provision method further includes: transmitting, to the first vehicle, an instruction that causes the first vehicle to stop an operation of the first vehicle, when the threat level is a third level indicating an anticipated risk of an impact on the operation; and transmitting, to the first vehicle, an instruction that causes the first vehicle to continue the operation of the first vehicle, when the threat level is a fourth level that is lower in the threat level than the third level.

With this, if the threat level of the attack is the third level, the operation of the first vehicle is stopped. If the threat level of the attack is the fourth level that is lower in the threat level than the third level, the operation of the first vehicle is continued. In other words, whether the operation of the first vehicle is to be stopped or continued can be determined depending on the threat level of the attack. Furthermore, the impact on the operation caused by the operation control for avoiding the impact of the attacked vehicle can be minimized.

It is possible that the information provision method further includes: in a case where the attack has an impact on a same type of vehicle, transmitting, to a second presenter included in a second vehicle that is of a same vehicle type as the first vehicle, an that causes the instruction second presenter to present countermeasure information, the countermeasure information presented by the second presenter being information that prompts a passenger inside the second vehicle or a person outside the second vehicle to act to avoid an impact of the attack.

With this, against the attack on the first vehicle that also has an impact on the second vehicle, the countermeasure information is also presented by the second presenter included in the second vehicle. This also prompts the passenger inside the second vehicle or the person outside the second vehicle to act to avoid the impact of this attack. As a result, this can also reduce the impact of the attacked second vehicle on the passenger inside the second vehicle or the person outside the second vehicle.

It is possible that the second presenter includes: a second interior presenter disposed inside a cabin of the second vehicle; and a second exterior presenter disposed on an exterior of the second vehicle, and that in the transmitting to the second presenter, in the case where the attack has the impact on the same type of vehicle, when the threat level is a first level indicating a risk that requires information provision inside and outside the second vehicle, the instruction that causes the second presenter to present the countermeasure information is transmitted to the second interior presenter and the second exterior presenter; and when the threat level is a second level that is lower in the threat level than the first level, the instruction that causes the second presenter to present the countermeasure information is transmitted only to the second interior presenter out of the second interior presenter and the second exterior presenter.

With this, against the attack on the first vehicle that also has the impact on the second vehicle, the countermeasure information is presented to the passenger inside the second vehicle and the person outside the second vehicle if the threat level of the attack is the first level. Moreover, in this case, the countermeasure information is presented to the passenger inside the second vehicle if the threat level of the attack is the second level that is lower in the threat level than the first level. In other words, a target for the presentation of the countermeasure information can be determined depending on the threat level of the attack. Furthermore, the number of targets for being prompted to act to avoid the impact of the attacked first vehicle can be minimized.

It is possible that the information provision method further includes, in the case where the attack has the impact on the same type of vehicle: transmitting, to the second vehicle, an instruction that causes the second vehicle to step an operation of the second vehicle, when the threat level is a third level indicating an anticipated risk of an impact on the operation; and transmitting, to the second vehicle, an instruction that causes the second vehicle to continue the operation of the second vehicle, when the threat level is a fourth level that is lower in the threat level than the third level.

With this, against the attack on the first vehicle that also has the impact on the second vehicle, the operation of the second vehicle is stopped if the threat level of the attack is the third level. Moreover, in this case, the operation of the second vehicle is continued if the threat level of the attack is the fourth level that is lower in the threat level than the third level. In other words, whether the operation of the second vehicle is to be stopped or continued can be determined depending on the threat level of the attack. Furthermore, the impact on the operation caused by the operation control for avoiding the impact of the attacked first vehicle can be minimized.

It is possible that the information processing device includes an operation database for managing an operation status of the first vehicle, and that the information provision method further includes: not transmitting, to a first interior presenter included in the first vehicle, the instruction that causes the first presenter to present the countermeasure information, when the operation status of the first vehicle stored in the operation database indicates that the first vehicle has no passenger on board.

With this, unnecessary presentation of the countermeasure information can be eliminated. This can reduce power consumption.

It is possible that the information processing device includes an operation database for managing an operation status of the first vehicle, and that the information provision method further includes: not transmitting, to the first presenter, the instruction that causes the first presenter to present the countermeasure information, when the operation status of the first vehicle stored in the operation database indicates that the first vehicle is not operated.

With this, unnecessary presentation of the countermeasure information can be eliminated. This can reduce power consumption.

In accordance with another aspect of the present disclosure, an information processing device that: obtains attack information through communication with a security monitoring device that determines presence or absence of an attack based on log information obtained from a vehicle; and provides countermeasure information to a passenger inside the vehicle or a person outside the vehicle, the information processing device including: a processor; and a memory, wherein the processor, by using the memory: receives, from the security monitoring device, attack information that includes a threat level and vehicle information in association with each other, the threat level indicating a level of threat of an attack on a first vehicle, the vehicle information being information for identifying the first vehicle; and transmits, to the first vehicle identified by the vehicle information, an instruction that causes a first presenter included in the first vehicle to present countermeasure information determined depending on the threat level, the countermeasure information presented by the first presenter being information that prompts a passenger inside the first vehicle or a person outside the first vehicle to act to avoid an impact of the attack.

With this, against the attack on the first vehicle, the first presenter included in the first vehicle presents the countermeasure information. This prompts the passenger inside the first vehicle or the person outside the first vehicle to act to avoid the impact of this attack. As a result, this can reduce the impact of the attacked vehicle on the passenger inside the first vehicle or the person outside the first vehicle.

General or specific aspects of the present disclosure may be implemented to a system, a method, an integrated circuit, a computer program, a non-transitory computer-readable recording medium such as a Compact Disc-Read Only Memory (CD-ROM), or any given combination thereof.

Hereinafter, the information provision method and the information processing device according to an aspect of the present disclosure will be described in detail with reference to the drawing.

The following embodiment is a specific example of the present disclosure. The numerical values, shapes, materials, elements, arrangement and connection configuration of the elements, steps, the order of the steps, etc., described in the following embodiment are merely examples, and are not intended to limit the present disclosure. Among elements in the following embodiment, those not described in any one of the independent claims indicating the broadest concept of the present disclosure are described as optional elements.

Embodiment

The following describes Embodiment with reference to FIG. 1 to FIG. 13.

Configuration

FIG. 1 is a schematic view of an information provision system that provides information to a vehicle according to Embodiment.

More specifically, FIG. 1 illustrates security monitoring device 100, information processing device 200, vehicle 400, communication network 300, and base station 310 of a mobile communication network. Security monitoring device 100, information processing device 200, and vehicle 400 are communicatively connected to send and receive information between each other via communication network 300.

Security monitoring device 100 monitors a state of vehicle 400 and is disposed in a monitoring center. Security monitoring device 100 obtains log information periodically from vehicle 400 and monitors the state of vehicle 400 based on the obtained log information. More specifically, security monitoring device 100 determines the presence or absence of a security attack on vehicle 400, based on the log information. By reducing time to next obtainment of the log information from vehicle 400, security monitoring device 100 is able to determine the presence or absence of a security attack on vehicle 400 substantially in real time. If determining the presence of a security attack on vehicle 400, security monitoring device 100 transmits attack information obtained from the determination to information processing device 200.

Note that although one vehicle 400 is illustrated in FIG. 1, information provision system 1 may include a plurality of vehicles 400. More specifically, security monitoring device 100 may obtain log information periodically from each of the plurality of vehicles 400, determine the presence or absence of a security attack for each of the plurality of vehicles 400, and transmit attack information obtained for each of the plurality of vehicles 400 to information processing device 200. Security monitoring device 100 generates the attack information if determining the presence of a security attack on vehicle 400, and does not generate the attack information if determining the absence of a security attack on vehicle 400. Security monitoring device 100 is implemented by a computer, such as a server.

Information processing device 200 manages an operation of vehicle 400. Information processing device 200 obtains the operation status of vehicle 400 from vehicle 400 and manages the operation status of vehicle 400. In the event of a security attack on vehicle 400, information processing device 200 transmits, to vehicle 400, a control instruction appropriate to the security attack. For example, based on the received attack information for each vehicle, information processing device 200 determines the control instruction to be transmitted to this vehicle. Then, information processing device 200 transmits the determined control instruction to the vehicle corresponding to the attack information. Information processing device 200 is implemented by a computer, such as a server.

Vehicle 400 is an automated vehicle that is capable of autonomous driving. Vehicle 400 includes a presenter that presents information. Vehicle 400 controls an operation of vehicle 400 according to the received control instruction. More specifically, according to the control instruction, vehicle 400 may present the information to the presenter or control an operation related to motion of vehicle 400 (hereafter, this operation is referred to as the motion operation). For example, vehicle 400 may be a bus or a taxicab. Vehicle 400 may be an automated vehicle that is capable of autonomous driving.

Figure 2:
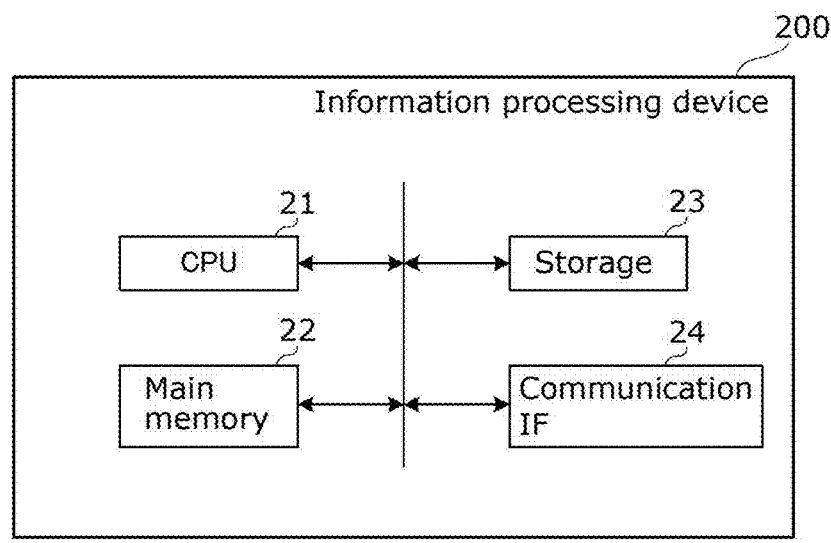
FIG. 2 is a block diagram illustrating an example of a hardware configuration of an information processing device according to Embodiment.

FIG. 2 is a block diagram illustrating an example of a hardware configuration of the information processing device according to Embodiment.

As illustrated in FIG. 2, information processing device 200 has a hardware configuration that includes central processing unit (CPU) 21, main memory 22, storage 23, and communication interface (communication IF) 24.

CPU 21 is a processor that executes a control program stored in, for example, storage 23.

Main memory 22 is a volatile storage area used as a work area when CPU 21 executes the control program.

Storage 23 is a nonvolatile storage area that holds, for example, the control program and content.

Communication IF 24 is a communication interface that communicates with security monitoring device 100 and vehicle 400 via communication network 300. For example, communication IF 24 is a wired LAN interface. Note that communication IF 24 may be a wireless LAN interface. Furthermore, communication IF 24 is not limited to a LAN interface and may be any communication interface that is able to establish a communication connection with a communication network.

Figure 3:
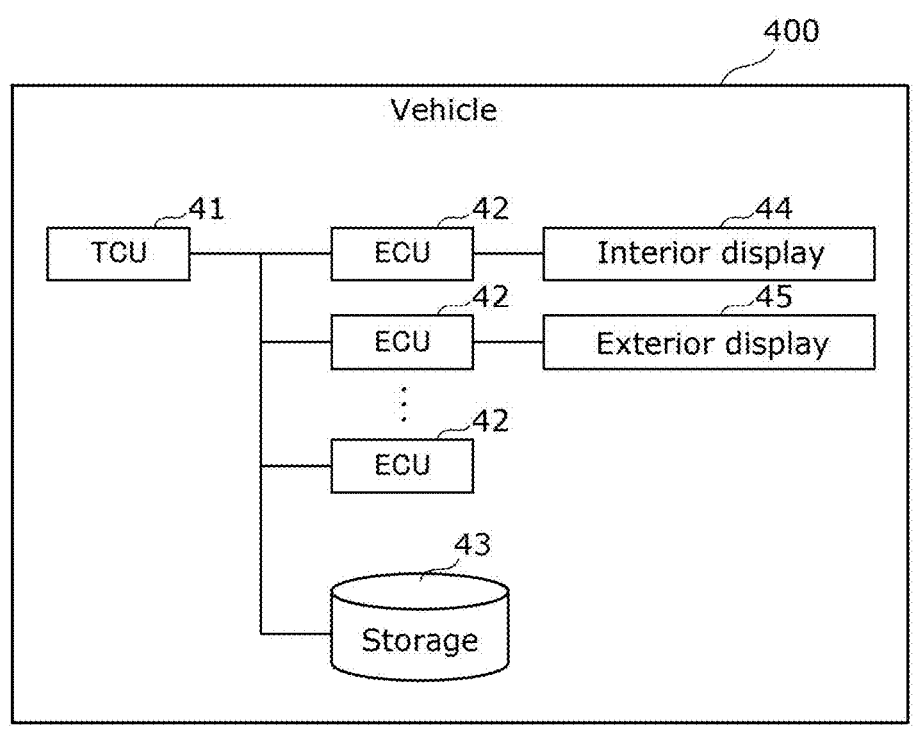
FIG. 3 is a block diagram illustrating an example of a hardware configuration of the vehicle according to Embodiment.

FIG. 3 is a block diagram illustrating an example of a hardware configuration of the vehicle according to Embodiment.

As illustrated in FIG. 3, vehicle 400 has a hardware configuration that includes telematics control unit (TCU) 41, a plurality of ECUs 42, storage 43, interior display 44, and exterior display 45.

TCU 41 is a communication unit that enables vehicle 400 to perform wireless communication with communication network 300. TCU 41 is a communication unit including a cellular module that meets a mobile communication network standard.

The plurality of ECUs 42 are control circuits that control interior display 44 and exterior display 45 of vehicle 400 or other devices of vehicle 400. Examples of the other devices include an engine, a motor, a meter, a transmission, brakes, steering, power windows, and an air conditioner. Furthermore, at least one of the plurality of ECUs 42 is a control circuit that controls the autonomous driving of vehicle 400. The plurality of ECUs 42 may be provided corresponding to these devices, each ECU 42 being provided per device. Although not shown, each of the plurality of ECUs 42 may include a storage (a nonvolatile storage area) that stores a program to be executed by ECU 42. The storage is a nonvolatile memory, for example.

Storage 43 is a nonvolatile storage area that holds, for example, a control program. Storage 43 is implemented by a hard disk drive (HDD) or a solid stated drive (SSD), for example Interior display 44 is disposed facing the inside of the cabin of vehicle 400 and displays information indicated by letters or symbols to a crew member or a passenger inside the cabin of vehicle 400. Interior display 44 may display an image. Interior display 44 may be a dot-matrix display, a liquid crystal display, or an organic electroluminescent (EL) display.

Exterior display 45 is disposed with its display surface facing the outside of vehicle 400 and displays information indicated by letters or symbols to a person outside vehicle 400. Exterior display 45 may be disposed without allowing a crew member or a passenger inside the cabin to see the display surface of exterior display 45. Exterior display 45 may be a dot-matrix display, a liquid crystal display, or an organic EL display.

Figure 4:
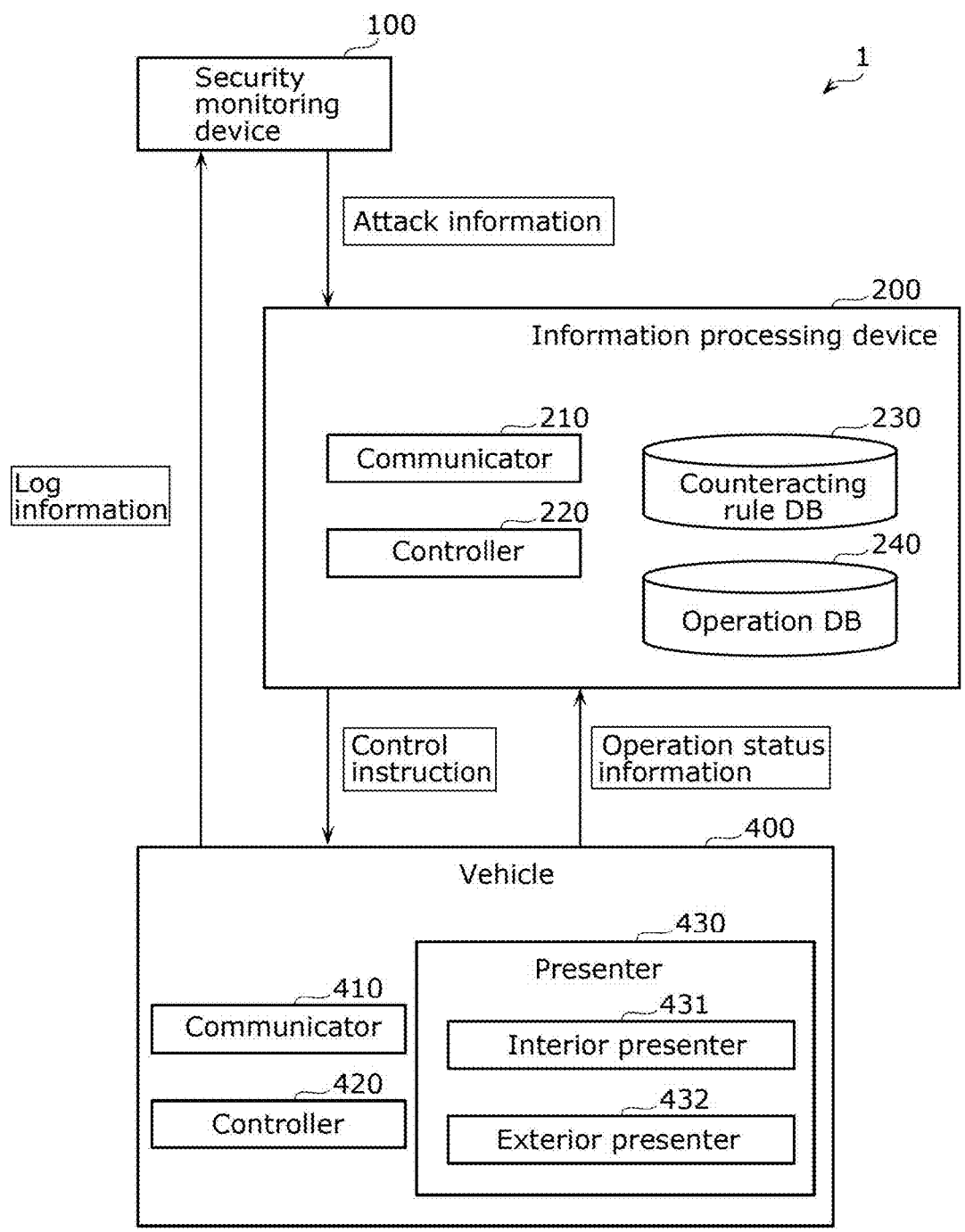
FIG. 4 is a block diagram illustrating an example of a functional configuration of the information provision system according to Embodiment.

Next, functional configurations of information processing device 200 and vehicle 400 of information provision system 1 are described. FIG. 4 is a block diagram illustrating an example of a functional configuration of the information provision system according to Embodiment. Here, note that communication network 300 is omitted from FIG. 4.

First, the functional configuration of information processing device 200 is described.

Information processing device 200 includes communicator 210, controller 220, counteracting rule database (DB) 230, and operation database (DB) 240.

Communicator 210 transmits and receives information to and from security monitoring device 100 via communication network 300. To be more specific, communicator 210 receives attack information from security monitoring device 100. Note that communicator 210 is implemented by communication IF 24.

The attack information includes a threat level indicating a level of threat of a security attack on vehicle 400 in association with vehicle information for identifying vehicle 400. The vehicle information is identification information for identifying vehicle 400 targeted for the security attack, or more specifically, vehicle 400 detected to be under the security attack. The threat level is information for ranking the type of the security attack depending on the level of the security attack. Note that vehicle 400 targeted for the security attack is an example of a first vehicle.

FIG. 5 is a table showing the association between the threat level and the type of the security attack.

For example, the threat level of the security attack may be ranked in three levels including: threat level A that is the highest; threat level B that is the second highest following threat level A; and threat level C that is the lowest. Examples of the security attack at threat level A include a security attack that leads vehicle 400 to make an unexpected false move and a security attack that leads vehicle 400 to be undrivable. Examples of the security attack at threat level B include a security attack that leads vehicle 400 to suffer performance degradation. Examples of the security attack at threat level C include a security attack that has no impact on the operation of vehicle 400. Threat level A is an example of a first level. Threat level B is an example of a second level. Each of threat level A and threat level B is an example of a third level. Threat level C is an example of a fourth level.

Communicator 210 transmits and receives information to and from vehicle 400 via communication network 300. To be more specific, communicator 210 transmits, to vehicle 400, a control instruction for vehicle 400. Examples of the control instruction include an operation instruction for controlling the operation of vehicle 400 and a presentation instruction for controlling the presentation by presenter 430 of vehicle 400. Examples of the operation instruction include an instruction for stopping the operation of vehicle 400 and an instruction for continuing the operation of vehicle 400. The instruction for stopping the operation of vehicle 400 refers to an instruction for stopping vehicle 400 if vehicle 400 is in motion. If vehicle 400 is stationary, this instruction refers to an instruction for maintaining the stationary state of vehicle 400. In other words, the instruction for stopping the operation of vehicle 400 is an instruction for stopping the autonomous driving of vehicle 400 by stopping the motion of vehicle 400. The instruction for continuing the operation of vehicle 400 refers to an instruction for continuing the autonomous driving of vehicle 400.

The presentation instruction includes at least an interior presentation instruction, out of the interior presentation instruction and an exterior presentation instruction. The interior presentation instruction causes interior presenter 431 of vehicle 400 to present countermeasure information. The exterior presentation instruction causes exterior presenter 432 of vehicle 400 to present countermeasure information. More specifically, out of the interior presentation instruction and the exterior presentation instruction, the presentation instruction may include both the interior presentation instruction and the exterior presentation instruction, or may include only the interior presentation instruction. The countermeasure information prompts a passenger inside vehicle 400 or a person outside vehicle 400 to act to avoid an impact of the security attack. For example, the countermeasure information is a message urging a crew member or a passenger inside vehicle 400 to step out of vehicle 400 after vehicle 400 stops moving. For example, the countermeasure information is a message urging a person outside vehicle 400 or another vehicle to move away from vehicle 400.

Controller 220 determines a control instruction that is to be transmitted to vehicle 400, based on the threat level included in the attack information received by communicator 210 and the counteracting rule stored in counteracting rule DB 230. Controller 220 generates the control instruction for vehicle 400 identified by the vehicle information included in the attack information. Note that controller 220 is implemented by CPU 21, main memory 22, and storage 23, for example.

Counteracting rule DB 230 stores counteracting rule 231 illustrated in FIG. 6 and counteracting rule 232 illustrated in FIG. 7. Note that counteracting rule DB 230 is implemented by storage 23, for example.

FIG. 6 is a table showing an example of the counteracting rule for the first vehicle targeted for a security attack. As described above, vehicle 400 is a specific example of the first vehicle.

Counteracting rule 231 for the first vehicle defines the control instruction for the first vehicle depending on the threat level of the security attack. More specifically, based on the attack information, controller 220 generates the control instruction for vehicle 400 targeted for the security attack, by reference to counteracting rule 231 of counteracting rule DB 230. Against a security attack at threat level A on vehicle 400, counteracting rule 231 includes a rule by which controller 220 generates a control instruction including: an operation stop instruction; an instruction for presenting the countermeasure information inside vehicle 400; and an instruction for presenting the countermeasure information outside vehicle 400. Against a security attack at threat level B on vehicle 400, counteracting rule 231 includes a rule by which controller 220 generates a control instruction including: an operation stop instruction; and an instruction for presenting the countermeasure information inside vehicle 400. Against the security attack at threat level B, controller 220 may generate the control instruction further including an instruction for not presenting the countermeasure information outside vehicle 400. Against a security attack at threat level C on vehicle 400, counteracting rule 231 includes a rule by which controller 220 generates a control instruction including an operation continuation instruction. Against the security attack at threat level C, controller 220 may generate the control instruction further including: an instruction for not presenting the countermeasure information inside vehicle 400; and an instruction for not presenting the countermeasure information outside vehicle 400.

FIG. 7 is a table showing an example of a counteracting rule for a second vehicle that is of the same vehicle type as the first vehicle. The second vehicle is another vehicle (not shown) that is of the same vehicle type as vehicle 400.

Counteracting rule 232 for the second vehicle defines the control instruction for the second vehicle depending on the threat level and the presence or absence of an impact on the same type of vehicle. The presence or absence of an impact on the same type of vehicle indicates whether the security attack on vehicle 400 also has an impact on another vehicle (or more specifically, the second vehicle) that is of the same vehicle type as vehicle 400. If the security attack on vehicle 400 also has an impact on another vehicle that is of the same vehicle type as vehicle 400, this security attack is classified as "present" as to whether an impact on the same type of vehicle is present or absent. In contrast, if the security attack on vehicle 400 has no impact on another vehicle that is of the same vehicle type as vehicle 400, this security attack is classified as "absent" as to whether an impact on the same type of vehicle is present or absent.

For example, the presence or absence of an impact of the security attack may be determined depending on whether another vehicle includes the same ECU or the same program version as vehicle 400, instead of depending on whether another vehicle is of the same vehicle type.

Against a security attack on vehicle 400 that is classified as "present" as to whether an impact on the same type of vehicle is present or absent, counteracting rule 232 defines the control instruction for another vehicle depending on the threat level of this security attack. More specifically, based on the attack information, controller 220 generates the control instruction for another vehicle that is of the same vehicle type as vehicle 400 targeted for the security attack, by reference to counteracting rule 232 of counteracting rule DB 230. Against the security attack on vehicle 400 that is classified as "present" as to whether an impact on the same type of vehicle is present or absent, the control instruction depending on the threat level of the security attack on another vehicle as defined by counteracting rule 232 is the same as the control instruction depending on the threat level of the security attack as defined by counteracting rule 231.

Against a security attack on vehicle 400 that is classified as "absent" as to whether an impact on the same type of vehicle is present or absent, counteracting rule 232 defines the control instruction depending on the threat level of the security attack on another vehicle as follows. Against the security attack at threat level A, B, or C on vehicle 400 in the above case, counteracting rule 232 includes a rule by which controller 220 generates a control instruction including the operation continuation instruction.

Counteracting rule DB 230 may store a counteracting rule illustrated in FIG. 8, instead of counteracting rule 231 illustrated in FIG. 6.

FIG. 8 is a table showing another example of the counteracting rule for the first vehicle targeted for a security attack.

Counteracting rule 233 for the first vehicle targeted for a security attack defines a control instruction for vehicle 400 depending on the threat level of the security attack and the operation status of the first vehicle. Counteracting rule 233 is different from counteracting rule 231 in that the control instruction for vehicle 400 is further defined depending on the operation status of the first vehicle. For example, the operation status may be classified as: "in operation (with passenger on board)", which indicates the vehicle is in operation with a passenger on board; "in operation (with no passenger on board), which indicates the vehicle is in operation with no passenger on board; "out of service (with no passenger on board)", which indicates the vehicle is out of service; and "not operated (stationary in depot)", which indicates the vehicle is not operated and stationary in a depot or a waiting area. Here, the operation status of each vehicle is managed in operation DB 240. Operation DB 240 is described in detail later. Upon receiving the attack information, controller 220 determines the operation status of vehicle 400 identified by the vehicle information included in the attack information, by reference to operation DB 240. Then, based on the attack information and the determined operation status, controller 220 generates the control instruction for vehicle 400 targeted for the security attack, by reference to counteracting rule 233 of counteracting rule DB 230.

For the operation status of vehicle 400 determined as "in operation (with passenger on board), the control instruction for vehicle 400 depending on the threat level of the security attack as defined by counteracting rule 233 is the same as the control instruction depending on the threat level of the security attack as defined by counteracting rule 231.

For the operation status of vehicle 400 determined as "in operation (with no passenger on board)" in the event of the security attack at threat level B, the control instruction for vehicle 400 depending on the threat level of the security attack as defined by counteracting rule 233 is different from the control instruction depending on the threat level of the security attack as defined by counteracting rule 231. In this case, because vehicle 400 has no passenger on board, the countermeasure information need not be presented inside the vehicle even in the event of the security attack at threat level B. Thus, for the operation status of vehicle 400 determined as "in operation (with no passenger on board)" in the event of threat level B, counteracting rule 233 defines a rule by which a control instruction including the operation stop instruction is generated.

For the operation status of vehicle 400 determined as "out of service (with no passenger on board)", the control instruction for vehicle 400 depending on the threat level of the security attack as defined by counteracting rule 233 is different in determining the operation instruction from the control instruction depending on the threat level of the security attack defined for the operation status determined as "in operation (with no passenger on board). To be more specific, the operation instruction in the event of threat level A or B indicates "out-of-service stop", and the operation instruction in the event of threat level C indicates "out-of-service continuation". The instruction indicating "out-of-service stop" stops the out-of-service state. The instruction for stopping the out-of-service state causes vehicle 400 that is in motion during the out-of-service operation to stop. Furthermore, the instruction for stopping the out-of-service state causes vehicle 400 that is stationary during the out-of-service operation to continue being stationary. In other words, the instruction for stopping the out-of-service state of vehicle 400 is an instruction for stopping the autonomous driving of vehicle 400 by stopping the motion of vehicle 400. The instruction indicating "out-of-service continuation" maintains the out-of-service state of vehicle 400. The instruction for continuing the out-of-service state of vehicle 400 continues the autonomous driving of vehicle 400 during the out-of-service operation.

Against a security attack at threat level A or B on vehicle 400 having the operation status as "not operated (stationary in depot)", counteracting rule 233 includes a rule by which controller 220 generates a control instruction including an operation instruction indicating "operation prohibition". Furthermore, against a security attack at threat level C on vehicle 400 having the operation status as "not operated (stationary in depot)", counteracting rule 233 includes a rule by which controller 220 generates a control instruction including an operation instruction indicating "operation permission". The instruction indicating "operation prohibition" prohibits a subsequent operation of vehicle 400. For example, the instruction for prohibiting the operation prohibits the operation of vehicle 400 until the impact of the security attack is resolved. The instruction indicating "operation permission" allows a subsequent operation of vehicle 400.

Note that counteracting rule 232 may also define a control instruction depending on the operation status. Against a security attack on vehicle 400 that is classified as "present" as to whether an impact on the same type of vehicle is present or absent, the control instruction depending on the threat level of the security attack on another vehicle as defined by counteracting rule 232 is the same as the control instruction depending on the threat level of the security attack as defined by counteracting rule 233.

FIG. 9 is a table showing the operation status stored for each vehicle in the operation DB.

Operation DB 240 stores, for each vehicle, the vehicle information for identifying the vehicle, the type of the vehicle, and the operation status of the vehicle in association with each other for management. Note that operation DB 240 is implemented by storage 23, for example.

Information processing device 200 may obtain, from vehicle 400, operation status information indicating the operation status of vehicle 400. The operation status information may be generated by vehicle 400 when the operation status of vehicle 400 changes. Whenever generated, the operation status information may be transmitted to information processing device 200. Regardless of whether the operation status of vehicle 400 changes, the operation status information may be periodically generated by vehicle 400 and, whenever generated, transmitted to information processing device 200. The operation status information includes the vehicle information on vehicle 400 in association with the operation status of vehicle 400. After obtaining the operation status information, information processing device 200 updates the operation status of the vehicle determined by the vehicle information included in this operation status information to the operation status included in the operation status information. This enables information processing device 200 to manage the operation status for each vehicle.

Next, a functional configuration of vehicle 400 is described.

Vehicle 400 includes communicator 410, controller 420, and presenter 430.

Communicator 410 transmits and receives information to and from security monitoring device 100 via communication network 300. To be more specific, communicator 410 transmits log information to security monitoring device 100. For example, the log information indicates a control status of vehicle 400 or a detection value of a sensor included in vehicle 400. Furthermore, communicator 410 transmits and receives information to and from information processing device 200 via communication network 300. To be more specific, communicator 410 transmits the operation status information to information processing device 200. Furthermore, communicator 410 receives a control instruction for vehicle 400 from information processing device 200. Note that communicator 410 is implemented by TCU 41.

Controller 420 controls an operation of vehicle 400 according to the control instruction received by communicator 410. For example, if the control instruction includes the instruction for stopping the motion of vehicle 400, controller 420 stops vehicle 400. For example, if the control instruction includes the interior presentation instruction, controller 420 causes interior presenter 431 to present the countermeasure information. If the control instruction includes the exterior presentation instruction, controller 420 causes exterior presenter 432 to present the countermeasure information. Controller 420 is implemented by the plurality of ECUs 42, for example.

Presenter 430 includes interior presenter 431 and exterior presenter 432. Interior presenter 431 is disposed inside the cabin of vehicle 400. Interior presenter 431 is implemented by interior display 44. Exterior presenter 432 is disposed on the exterior of vehicle 400. Exterior presenter 432 is implemented by exterior display 45.

FIG. 10 is a table showing an example of control instructions generated by the information processing device according to Embodiment. FIG. 10 illustrates the control instructions generated against the security attack at threat level A on vehicle 400 that has an impact on the same type of vehicle. The control instruction illustrated in FIG. 10 is an example of the control instruction generated corresponding to the operation status illustrated in FIG. 9 by reference to counteracting rule 232 illustrated in FIG. 7 and counteracting rule 233 illustrated in FIG. 8.

The operation status of vehicle 400 targeted for the security attack at threat level A is "in operation (with passenger on board)". Thus, controller 220 generates the control instruction corresponding to the operation status "in operation (with passenger on board)" and to threat level A as defined by counteracting rule 233. To be more specific, controller 220 generates the control instruction that includes the operation stop instruction, the interior presentation instruction, and the exterior presentation instruction.

Here, the security attack on vehicle 400 has an impact on the same type of vehicle. For this reason, similar to the control instruction for vehicle 400, the control instruction based on counteracting rule 231 is generated for vehicle 401 and vehicle 403 that are of the same vehicle type as vehicle 400. The operation status of vehicle 401 is "in operation (with passenger on board)", and thus the same control instruction as the one generated for vehicle 400 is generated. Meanwhile, the operation status of vehicle 403 is "not operated", and thus the control instruction including the operation prohibition instruction is generated. Note that because vehicle 402 differs in type from vehicle 400, a control instruction for vehicle 402 need not be generated.

Figure 11:
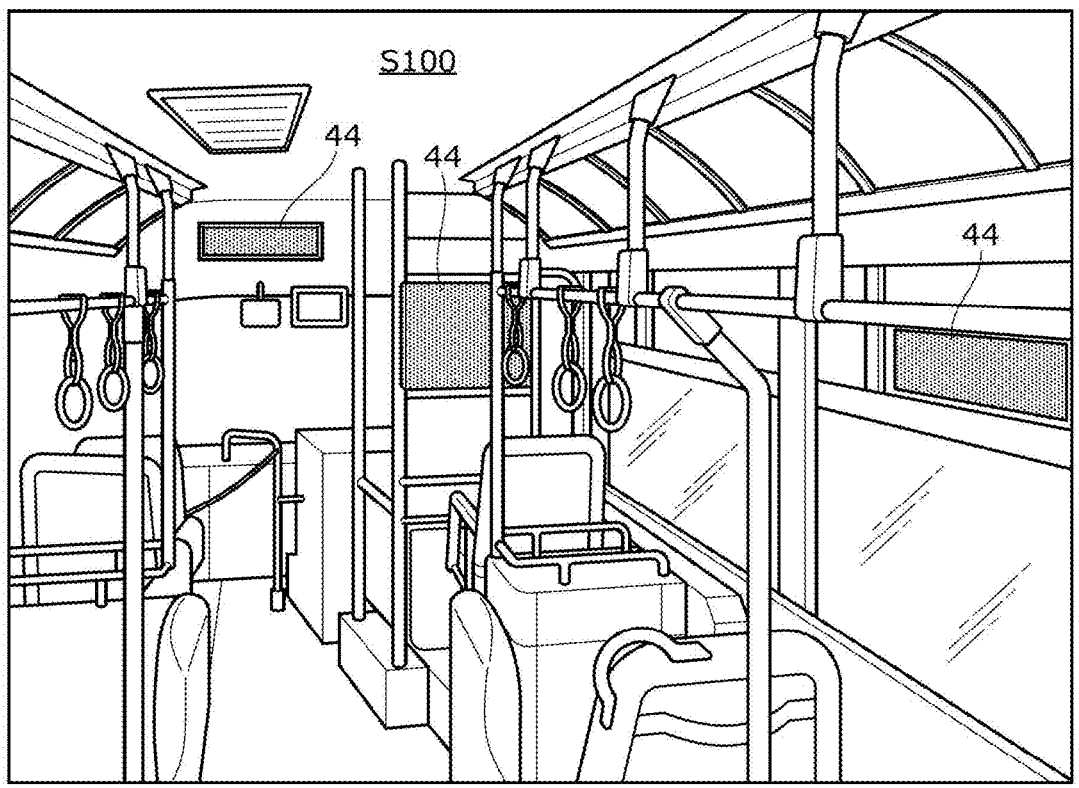
FIG. 11 is a diagram illustrating an example of placement of interior displays of the vehicle according to Embodiment.

FIG. 11 is a diagram illustrating an example of placement of interior displays of the vehicle according to Embodiment.

As illustrated in FIG. 11, interior display 44 may be disposed on a front or side wall in the traveling direction of vehicle 400, in space S100 of the cabin of vehicle 400.

Figure 12:
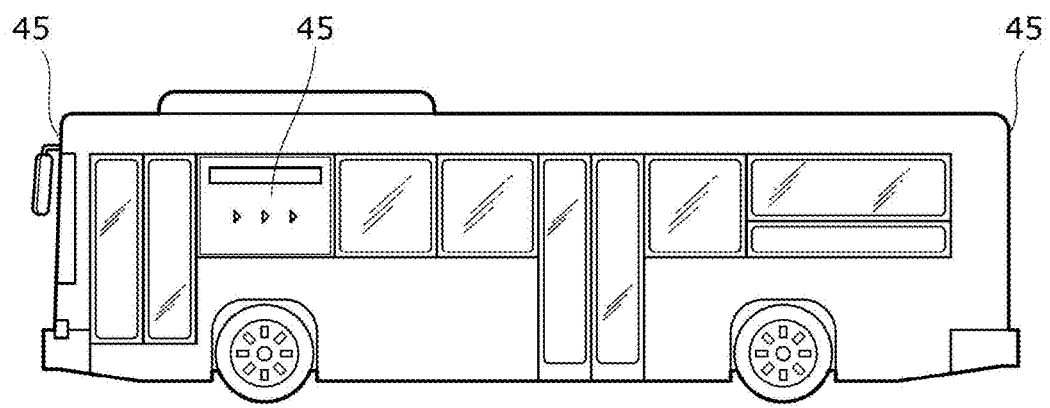
FIG. 12 is a diagram illustrating an example of placement of exterior displays of the vehicle according to Embodiment.

FIG. 12 is a diagram illustrating an example of placement of exterior displays of the vehicle according to Embodiment.

As illustrated in FIG. 12, exterior display 45 may be disposed on a front, side, or back wall in the traveling direction of vehicle 400, on the exterior of vehicle 400.

Operation

Figure 13:
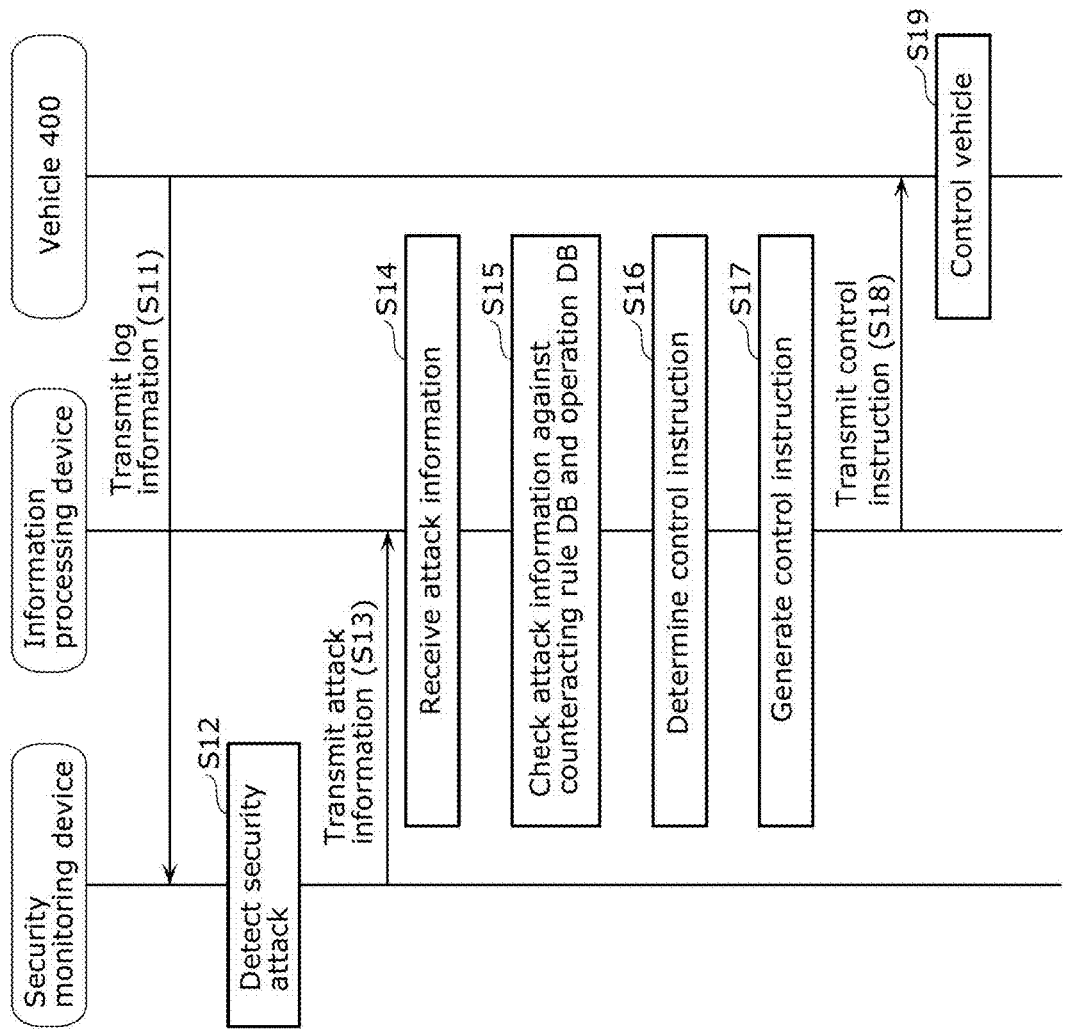
FIG. 13 is a sequence diagram illustrating an example of an information provision method executed by the information provision system according to Embodiment.

FIG. 13 is a sequence diagram illustrating an example of an information provision method executed by the information provision system according to Embodiment. FIG. 13 illustrates an example of the method executed using counteracting rules 222 and 223.

Vehicle 400 transmits the log information to security monitoring device 100 (S11).

Security monitoring device 100 detects the presence of a security attack on vehicle 400, based on the log information (S12).

Security monitoring device 100 transmits, to information processing device 200, the attack information that includes the threat level of the security attack in association with the vehicle information for identifying vehicle 400 targeted for the security attack (S13).

Information processing device 200 receives the attack information (S14), and then checks the attack information against counteracting rule DB 230 and operation DB 240 (S15).

Next, based on the vehicle information included in the attack information, information processing device 200 determines the operation status of vehicle 400 by reference to operation DB 240. Based on the threat level included in the attack information and the determined operation status, information processing device 200 determines the control instruction for vehicle 400 by reference to counteracting rule DB 230 (S16). Note that, against the security attack on vehicle 400 that has an impact on the same type of vehicle, information processing device 200 determines the control instruction for another vehicle that is of the same vehicle type as vehicle 400.

Then, information processing device 200 generates the determined control instruction (S17).

Information processing device 200 transmits the generated control instruction to vehicle 400 (S18). Here, when generating the control instruction for another vehicle, information processing device 200 transmits this control instruction to another vehicle.

Advantageous Effects Etc

An information provision method according to the present embodiment is executed by information processing device 200 that: obtains attack information through communication with security monitoring device 100, which determines presence or absence of an attack based on log information obtained from vehicle 400; and provides countermeasure information to a passenger inside vehicle 400 or a person outside vehicle 400. Information processing device 200 receives, from security monitoring device 100, attack information that includes a threat level indicating a level of threat of a security attack in association with vehicle information for identifying vehicle 400. Then, information processing device 200 transmits, to vehicle 400 identified by the vehicle information, an instruction that causes presenter 430 included in vehicle 400 to present countermeasure information determined depending on the threat level. The countermeasure information presented by presenter 430 being information that prompts a passenger inside vehicle 400 or a person outside vehicle 400 to act to avoid an impact of the security attack.

With this, against the security attack on vehicle 400, information processing device 200 causes presenter 430 included in vehicle 400 to present the countermeasure information. This prompts the passenger inside vehicle 400 or the person outside vehicle 400 to act to avoid the impact of this security attack. As a result, this can reduce the impact of security-attacked vehicle 400 on the passenger inside vehicle 400 or the person outside vehicle 400.

Furthermore, by the information provision method according to the present embodiment, presenter 430 includes: interior presenter 431 disposed inside the cabin of vehicle 400; and exterior presenter 432 disposed on the exterior of vehicle 400. Information processing device 200 transmits, to interior presenter 431 and exterior presenter 432, an instruction for presenting the countermeasure information if the threat level is threat level A (the first level) indicating a risk that requires information provision inside and outside vehicle 400. Information processing device 200 transmits, only to interior presenter 431 out of interior presenter 431 and exterior presenter 432, an instruction for presenting the countermeasure information if the threat level is threat level B (the second level) that is lower in the threat level than threat level A (the first level).

With this, if the threat level of the security attack is threat level A (the first level), information processing device 200 presents the countermeasure information to the passenger inside vehicle 400 and the person outside vehicle 400. If the threat level of the security attack is threat level B (the second level) that is lower in the threat level than threat level A (the first level), information processing device 200 presents the countermeasure information to the passenger inside vehicle 400. In other words, information processing device 200 is able to determine a target for the presentation of the countermeasure information, depending on the threat level of the security attack. Furthermore, information processing device 200 is able to minimize the number of targets for being prompted to act to avoid the impact of security-attacked vehicle 400.

Furthermore, by the information provision method according to the present embodiment, information processing device 200 transmits, to vehicle 400, an instruction for stopping an operation of vehicle 400 if the threat level is threat level A or B (the third level) indicating an anticipated risk of an impact on the operation. Information processing device 200 transmits, to vehicle 400, an instruction for continuing the operation of vehicle 400 if the threat level is threat level C (the fourth level) that is lower in the threat level than threat level A or B (the third level).

With this, if the threat level of the security attack is threat level A or B (the third level), information processing device 200 stops the operation of vehicle 400. If the threat level of the attack is threat level C (the fourth level) that is lower in the threat level than threat level A or B (the third level), information processing device 200 continues the operation of vehicle 400. In other words, information processing device 200 is able to determine whether to stop or continue the operation of vehicle 400, depending on the threat level of the security attack. Furthermore, information processing device 200 is able to minimize the impact on the operation caused by the operation control for avoiding the impact of security-attacked vehicle 400.

Furthermore, by the information provision method according to the present embodiment, against the attack having an impact on the same type of vehicle, information processing device 200 transmits, to a presenter included in vehicle 401 that is of the same vehicle type as vehicle 400, an instruction for presenting the countermeasure information.

With this, against the security attack on vehicle 400 that also has an impact on vehicle 401, information processing device 200 also causes the presenter included in vehicle 401 to present the countermeasure information. This also prompts the passenger inside vehicle 401 or the person outside vehicle 401 to act to avoid the impact of this security attack. As a result, information processing device 200 is also able to reduce the impact of security-attacked vehicle 401 on the passenger inside vehicle 401 or the person outside vehicle 401.

Furthermore, by the information provision method according to the present embodiment, the presenter of vehicle 401 includes: an interior presenter disposed inside the cabin of vehicle 401; and an exterior presenter disposed on the exterior of vehicle 401. Against the attack having the impact on the same type of vehicle, information processing device 200 transmits, to interior presenter and the exterior presenter of vehicle 401, an instruction for presenting the countermeasure information if the threat level is threat level A (the first level) indicating a risk that requires information provision inside and outside vehicle 401. Against the attack having the impact on the same type of vehicle, information processing device 200 transmits, only to the interior presenter out of the interior presenter and the exterior presenter of vehicle 401, an instruction for presenting the countermeasure information if the threat level is threat level B (the second level) that is lower in the threat level than threat level A (the first level).

With this, against the security attack on vehicle 400 that also has the impact on vehicle 401, information processing device 200 presents the countermeasure information to the passenger inside vehicle 401 and the person outside vehicle 401 if the threat level of the security attack is threat level A (the first level). Moreover, in this case, information processing device 200 presents the countermeasure information to the passenger inside vehicle 401 if the threat level of the security attack is threat level B (the second level) that is lower in the threat level than threat level A (the first level). In other words, information processing device 200 is able to determine a target for the presentation of the countermeasure information, depending on the threat level of the security attack. Furthermore, information processing device 200 is able to minimize the number of targets for being prompted to act to avoid the impact of security-attacked vehicle 400.

Furthermore, by the information provision method according to the present embodiment, against the attack having the impact on the same type of vehicle, information processing device 200 transmits, to vehicle 401, an instruction for stopping an operation of vehicle 401 if the threat level is threat level A or B (the third level) indicating an anticipated risk of an impact on the operation. Against the attack having the impact on the same type of vehicle, information processing device 200 transmits, to vehicle 401, an instruction for continuing the operation of vehicle 401 if the threat level is threat level C (the fourth level) that is lower in the threat level than threat level A or B (the third level).

With this, against the security attack on vehicle 400 that also has the impact on vehicle 401, information processing device 200 stops operation vehicle 401 if the threat level of the security attack is threat level A or B (the third level). Moreover, in this case, information processing device 200 continues the operation of vehicle 401 if the threat level of the security attack is threat level C (the fourth level) that is lower in the threat level than threat level A or B (the third level). In other words, information processing device 200 is able to determine whether to stop or continue the operation of vehicle 401, depending on the threat level of the security attack. Furthermore, information processing device 200 is able to minimize the impact on the operation caused by the operation control for avoiding the impact of security-attacked vehicle 400.

Furthermore, by the information provision method according to the present embodiment, the information processing device includes operation DB 240 for managing an operation status of a vehicle. Information processing device 200 does not transmit, to interior presenter 431, an instruction for presenting the countermeasure information if the operation status of vehicle 400 stored in operation DB 240 indicates that vehicle 400 has no passenger on board. With this, unnecessary presentation of the countermeasure information can be eliminated. This can reduce power consumption.

Furthermore, by the information provision method according to the present embodiment, information processing device 200 includes operation DB 240 for managing an operation status of a vehicle. Information processing device 200 does not transmit, to presenter 430, an instruction for presenting the countermeasure information if the operation status of vehicle 400 stored in operation DB 240 indicates that vehicle 400 is not operated. With this, unnecessary presentation of the countermeasure information can be eliminated.

This can reduce power consumption.

Variations

[1]

In Embodiment above, interior presenter 431 and exterior presenter 432 of vehicle 400 are displays for displaying the information. However, this is not intended to be limiting. These presenters may be loudspeakers for outputting the information by sound.

[2]

In Embodiment above, security monitoring device 100 generates no attack information in the absence of a security attack. However, this is not intended to be limiting. Regardless of the presence or absence of a security attack, the attack information indicating the presence or absence of a security attack on vehicle 400 may be generated. To be more specific, if determining the presence of a security attack on vehicle 400, security monitoring device 100 may generate the attack information including the information indicating the presence of the security attack. Furthermore, if determining the absence of a security attack, security monitoring device 100 may generate the attack information including the information indicating the absence of a security attack.

Each of the elements in each embodiments described above may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

More specifically, this program causes a computer to execute an information provision method that is executed by an information obtains attack information through processing device that: communication with a security monitoring device, which determines presence or absence of an attack based on log information obtained from a vehicle; and provides countermeasure information to a passenger inside the vehicle or a person outside the vehicle. The information provision method includes: receiving, from the security monitoring device, attack information that includes a threat level indicating a level of threat of an attack on a first vehicle in association with vehicle information for identifying the first vehicle; and transmitting, to the first vehicle identified by the vehicle information, an instruction that causes a first presenter included in the first vehicle to present countermeasure information determined depending on the threat level, the countermeasure information presented by the first presenter being information that prompts a passenger inside the first vehicle or a person outside the first vehicle to act to avoid an impact of the attack.

Although the information processing method according to one or more aspects of the present disclosure has been described based on the above embodiment, the present disclosure is not limited to the embodiment. Those skilled in the art will readily appreciate that embodiments arrived at by making various modifications to the above embodiments or embodiments arrived at by selectively combining elements disclosed in the above embodiment without materially departing from the scope of the present disclosure may be included within one or more aspects of the present disclosure.

While the embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-032354 filed on Mar. 3, 2022, and PCT International Application No. PCT/JP2022/038437 filed on Oct. 14, 2022.

INDUSTRIAL APPLICABILITY

The present disclosure is useful as an information provision method and an information processing device that are capable of reducing an impact of an attacked vehicle on a passenger inside a first vehicle or a person outside the first vehicle.

The invention claimed is:

1. An information provision method executed by an information processing device that: obtains attack information through communication with a security monitoring device that determines presence or absence of an attack based on log information obtained from a vehicle; and provides countermeasure information to a passenger inside the vehicle or a person outside the vehicle, the information provision method comprising:
receiving, from the security monitoring device, attack information that includes a threat level and vehicle information in association with each other, the threat level indicating a level of threat of an attack on a first vehicle, the vehicle information being information for identifying the first vehicle; and
transmitting, to the first vehicle identified by the vehicle information, an instruction that causes a first presenter included in the first vehicle to present countermeasure information determined depending on the threat level, the countermeasure information presented by the first presenter being information that prompts a passenger inside the first vehicle or a person outside the first vehicle to act to avoid an impact of the attack.

2. The information provision method according to claim 1,
wherein the first presenter includes: a first interior presenter disposed inside a cabin of the first vehicle; and a first exterior presenter disposed on an exterior of the first vehicle, and
in the transmitting,
when the threat level is a first level indicating a risk that requires information provision inside and outside the first vehicle, the instruction that causes the first presenter to present the countermeasure information is transmitted to the first interior presenter and the first exterior presenter, and
when the threat level is a second level that is lower in the threat level than the first level, the instruction that causes the first presenter to present the countermeasure information is transmitted only to the first interior presenter out of the first interior presenter and the first exterior presenter.

3. The information provision method according to claim 1, further comprising:
transmitting, to the first vehicle, an instruction that causes the first vehicle to stop an operation of the first vehicle, when the threat level is a third level indicating an anticipated risk of an impact on the operation; and
transmitting, to the first vehicle, an instruction that causes the first vehicle to continue the operation of the first vehicle, when the threat level is a fourth level that is lower in the threat level than the third level.

4. The information provision method according to claim 1, further comprising:
in a case where the attack has an impact on a same type of vehicle,
transmitting, to a second presenter included in a second vehicle that is of a same vehicle type as the first vehicle, an instruction that causes the second presenter to present countermeasure information, the countermeasure information presented by the second presenter being information that prompts a passenger inside the second vehicle or a person outside the second vehicle to act to avoid an impact of the attack.

5. The information provision method according to claim 4,
wherein the second presenter includes: a second interior presenter disposed inside a cabin of the second vehicle; and a second exterior presenter disposed on an exterior of the second vehicle, and
in the transmitting to the second presenter,
in the case where the attack has the impact on the same type of vehicle,
when the threat level is a first level indicating a risk that requires information provision inside and outside the second vehicle, the instruction that causes the second presenter to present the countermeasure information is transmitted to the second interior presenter and the second exterior presenter; and
when the threat level is a second level that is lower in the threat level than the first level, the instruction that causes the second presenter to present the countermeasure information is transmitted only to the second interior presenter out of the second interior presenter and the second exterior presenter.

6. The information provision method according to claim 4, further comprising,
in the case where the attack has the impact on the same type of vehicle:
transmitting, to the second vehicle, an instruction that causes the second vehicle to step an operation of the second vehicle, when the threat level is a third level indicating an anticipated risk of an impact on the operation; and
transmitting, to the second vehicle, an instruction that causes the second vehicle to continue the operation of the second vehicle, when the threat level is a fourth level that is lower in the threat level than the third level.

7. The information provision method according to claim 1,
wherein the information processing device includes an operation database for managing an operation status of the first vehicle, and
the information provision method further comprises:
not transmitting, to a first interior presenter included in the first vehicle, the instruction that causes the first presenter to present the countermeasure information, when the operation status of the first vehicle stored in the operation database indicates that the first vehicle has no passenger on board.

8. The information provision method according to claim 1,
wherein the information processing device includes an operation database for managing an operation status of the first vehicle, and
the information provision method further comprises:
not transmitting, to the first presenter, the instruction that causes the first presenter to present the countermeasure information, when the operation status of the first vehicle stored in the operation database indicates that the first vehicle is not operated.

9. An information processing device that: obtains attack information through communication with a security monitoring device that determines presence or absence of an attack based on log information obtained from a vehicle; and provides countermeasure information to a passenger inside the vehicle or a person outside the vehicle, the information processing device comprising:
a processor; and
a memory,
wherein the processor, by using the memory:
receives, from the security monitoring device, attack information that includes a threat level and vehicle information in association with each other, the threat level indicating a level of threat of an attack on a first vehicle, the vehicle information being information for identifying the first vehicle; and
transmits, to the first vehicle identified by the vehicle information, an instruction that causes a first presenter included in the first vehicle to present countermeasure information determined depending on the threat level, the countermeasure information presented by the first presenter being information that prompts a passenger inside the first vehicle or a person outside the first vehicle to act to avoid an impact of the attack.

* * * * *